(12) United States Patent
Cox et al.

(10) Patent No.: US 12,120,223 B2
(45) Date of Patent: Oct. 15, 2024

(54) SCALABLE SECURITY FOR CRYPTOGRAPHIC LEDGERS VIA DYNAMIC AND UNPREDICTABLE CHANGES TO QUORUM MEMBERSHIPS

(71) Applicant: Google LLC, Mountain View, CA (US)

(72) Inventors: William Douglas Cox, Mill Valley, CA (US); Bo Zhu, San Jose, CA (US); Orest Bolohan, San Jose, CA (US); Sheldon I. Walfish, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/346,513

(22) Filed: Jul. 3, 2023

(65) Prior Publication Data

US 2024/0048366 A1 Feb. 8, 2024

Related U.S. Application Data

(63) Continuation of application No. 17/676,607, filed on Feb. 21, 2022, now Pat. No. 11,736,278, which is a
(Continued)

(51) Int. Cl.
*H04L 29/06* (2006.01)
*H04L 9/06* (2006.01)
(Continued)

(52) U.S. Cl.
CPC ............ *H04L 9/085* (2013.01); *H04L 9/0637* (2013.01); *H04L 9/0643* (2013.01); *H04L 9/30* (2013.01)

(58) Field of Classification Search
CPC ..... H04L 9/085; H04L 9/0637; H04L 9/0643; H04L 9/30
See application file for complete search history.

(56) References Cited

U.S. PATENT DOCUMENTS 10,067,810 B2 9/2018 Surcouf et al.
10,454,878 B2 4/2019 Khan et al.
(Continued)

FOREIGN PATENT DOCUMENTS

WO    WO 2019/003071    1/2019

OTHER PUBLICATIONS

Naor, Moni, and Udi Wieder. "Scalable and dynamic quorum systems." Proceedings of the twenty-second annual symposium on Principles of distributed computing. 2003. (Year: 2003).*
(Continued)

*Primary Examiner* — Shawnchoy Rahman
(74) *Attorney, Agent, or Firm* — DORITY & MANNING P.A.

(57) ABSTRACT

The present disclosure provides computing systems in which respective quorums of computing nodes securely manage respective secrets associated with cryptographic ledgers according to threshold secret sharing schemes. In particular, membership in the quorums can be changed dynamically and unpredictability to improve security of the quorums against adversarial attacks in which adversaries attempt to compromise or gain control of the computing nodes. More specifically, by changing membership in the quorum dynamically and unpredictability, the ability of the adversary to control at any given time a threshold number of the current members of the quorum and gain access to the secret is dramatically reduced.

20 Claims, 3 Drawing Sheets

Related U.S. Application Data continuation of application No. 16/818,356, filed on Mar. 13, 2020, now Pat. No. 11,258,593.

(60) Provisional application No. 62/817,740, filed on Mar. 13, 2019.

(51) Int. Cl.
*H04L 9/08* (2006.01)
*H04L 9/30* (2006.01)

(56) References Cited

U.S. PATENT DOCUMENTS

| | | | |
|---|---|---|---|
| 10,380,685 | B1 | 8/2019 | Phillips et al. |
| 10,623,190 | B2 | 4/2020 | Scherrer et al. |
| 10,834,095 | B2 | 11/2020 | Irazabal et al. |
| 10,917,234 | B2 | 2/2021 | Mehedy et al. |
| 11,018,848 | B2 * | 5/2021 | Castinado ............ H04L 9/3239 |
| 11,102,008 | B2 | 8/2021 | Maher |
| 2017/0228547 | A1 | 8/2017 | Smith et al. |
| 2018/0218176 | A1 * | 8/2018 | Voorhees ............ G06Q 20/02 |
| 2019/0068615 | A1 | 2/2019 | Pack et al. |
| 2019/0349203 | A1 | 11/2019 | Scherrer et al. |
| 2020/0065802 | A1 | 2/2020 | Mathieson et al. |

OTHER PUBLICATIONS

Bracciali, Andrea, Davide Grossi, and Ronald de Haan. "Decentralization in Open Quorum Systems." arXiv preprint arXiv:1911.08182 (2019). (Year: 2019).*

Luongo et al., "The Keep Network: A Privacy Layer for Public Blockchains.", KEEP Network, Tech. Rep., 2018, [Online]. Available: https://keep.network/whitepaper, 2017. (Year: 2017).

Maram et al., "CHURP: Dynamic-Committee Proactive Secret Sharing.", Conference on Computer and Communications Security, Nov. 11-15, 2019, London, England, United Kingdom, 20 pages.

Stathakopoulous et al., "Threshold Signatures for Blockchain Systemis." Swiss Federal Institute of Technology 30, Apr. 4, 2017, 42 pages.

* cited by examiner

SCALABLE SECURITY FOR CRYPTOGRAPHIC LEDGERS VIA DYNAMIC AND UNPREDICTABLE CHANGES TO QUORUM MEMBERSHIPS

RELATED APPLICATIONS

This application is a continuation of U.S. patent application Ser. No. 17/676,607, filed Feb. 21, 2022, now U.S. Pat. No. 11,736,278, which claims priority to and benefit of U.S. patent application Ser. No. 16/818,356, filed Feb. 22, 2022, now U.S. Pat. No. 11,258,593, which claims priority to and the benefit of U.S. Provisional Patent Application No. 62/817,740, each of which is hereby incorporated by reference in its entirety.

FIELD

The present disclosure relates generally to cryptography. More particularly, the present disclosure relates to dynamically and unpredictably changing quorums of computing nodes that securely manage secrets associated with cryptographic ledgers according to threshold secret sharing schemes.

BACKGROUND

A cryptographic ledger (also known as a "blockchain") can refer to a dataset that includes or evidences a growing list of records (e.g., referred to as "blocks") which are linked using cryptography. For example, in some designs, each block can contain a cryptographic hash of the previous block, a timestamp, and transaction data (e.g., which can be represented as a Merkle tree root hash). The recorded transaction data can evidence transactions between two or more parties efficiently and in a verifiable and permanent way. The transactions can include distribution of assets or other actions or operations.

By design, a cryptographic ledger is resistant to modification of the data and is, therefore, often referred to as being immutable. In particular, once recorded, the data in any given block cannot be altered retroactively without alteration of all subsequent blocks.

Certain popular cryptographic ledgers are stored as an open, distributed ledger. For example, for use as a distributed ledger, a cryptographic ledger can be typically managed by a peer-to-peer network that collectively adheres to a protocol for inter-node communication and validating new blocks.

In some implementations of distributed blockchain technology, any alteration to the cryptographic ledger may require consensus of the majority of the associated network. Thus, although cryptographic ledger records are not entirely unalterable, the ledgers may be considered secure by design and exemplify a distributed computing system with high Byzantine fault tolerance.

Many enterprises are attempting to adopt blockchain technology, partly because it enables them to immutably document transactions without having to extend "trust" to the other party. However, certain common blockchain algorithms suffer from a number of drawbacks which limit their applicability to different uses and environments, particularly at the enterprise level.

As one example drawback, in certain popular, existing blockchain systems, all of the content of cryptographic ledger is entirely publicly visible. As such, these systems are highly unsuitable for use with confidential or private data, such as passwords or credit card numbers, since all data is visible to each participant.

As another example drawback, other existing algorithms (e.g., Bitcoin and Ethereum) operate on only a single global cryptographic ledger. That is, every single transaction occurring globally is required to be reflected on the same, single cryptographic ledger, which results in large processing times and significant uncertainty. This structure does not scale to satisfy enterprise needs, where an entity may need to process hundreds of thousands or even millions of transactions per second.

To counter this drawback, certain alternative frameworks have been proposed for enterprise blockchain applications. These frameworks permit the use of multiple different ledgers respectively for multiple different enterprises/entities. However, these frameworks are enabled by reducing or even eliminating the distributed nature of cryptographic ledger and, instead, placing control of the ledger in only a few trusted computing nodes. Unfortunately, the more such system scales, the less secure it becomes as network security is only as strong as the weakest computing node. This means each participant must extend "trust" to the other participants to securely manage their computing nodes, defeating the benefits of the distributed blockchain solution.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for secure management of cryptographic ledgers. The method includes identifying, by a computing system, a current iteration of a quorum for a cryptographic ledger, wherein the current iteration of the quorum comprises a first set of computing nodes that respectively store respective shares of a secret associated with the cryptographic ledger according to a threshold secret sharing scheme. The method includes accessing, by the computing system, data descriptive of a plurality of candidate computing nodes that are available for selection for inclusion in a subsequent iteration of the quorum for the cryptographic ledger, wherein the subsequent iteration of the quorum comprises a second set of computing nodes. The method includes evaluating, by the computing system, each respective candidate computing node of the plurality of candidate computing nodes to determine whether the respective candidate computing node satisfies one or more selection constraints. The method includes selecting, by the computing system, one or more of the plurality of candidate computing nodes that satisfy the one or more selection constraints for inclusion in the second set of computing nodes that form the subsequent iteration of the quorum for the cryptographic ledger.

Another example aspect of the present disclosure is directed to a computing system. The computing system includes one or more master computing nodes that are members of a master quorum. The one or more master computing nodes respectively store respective shares of a master secret according to a threshold secret sharing scheme. The master quorum is configured to use the master secret to control changes in a respective membership of each of a plurality of subordinate quorums that are respectively associated with a plurality of cryptographic ledgers. The respective membership of each subordinate quorum comprises a dynamically changing plurality of subordinate computing nodes that respectively store respective shares of a respective subordinate secret associated with the respective cryptographic ledger according to the threshold secret sharing scheme.

Another example aspect of the present disclosure is directed to one or more non-transitory computer-readable media that collective store data descriptive of a cryptographic ledger. The cryptographic ledger comprises a smart contract that controls operations of a quorum of computing nodes able to perform operations on the cryptographic ledger. The quorum of computing nodes respectively store respective shares of a secret associated with the cryptographic ledger according to a threshold secret sharing scheme. The smart contract comprises at least one rule that enables control of the quorum via a backdoor under a condition that each instance of control of the quorum undertaken under the at least one rule is irreversibly acknowledged on the cryptographic ledger.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
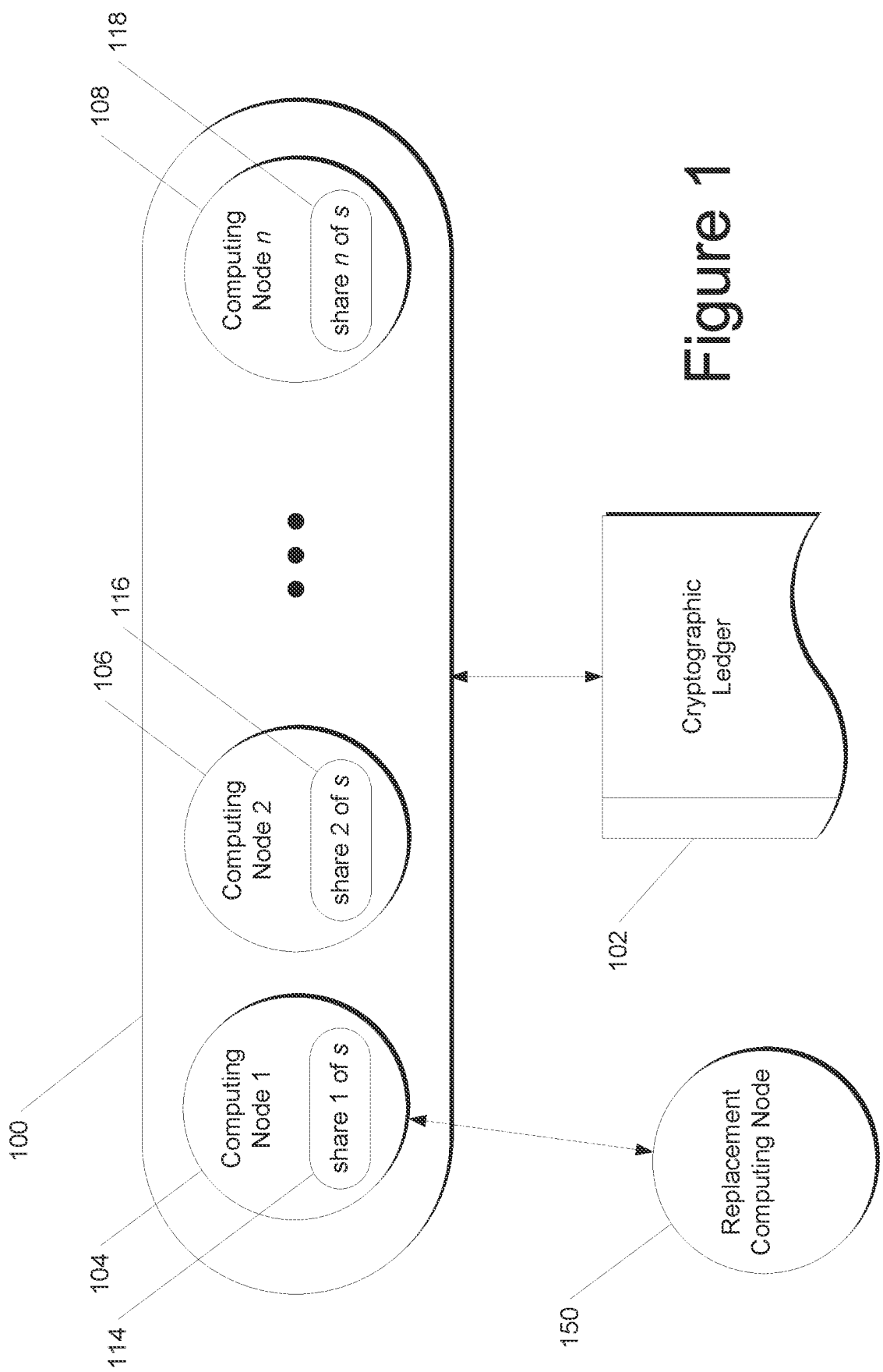
FIG. 1 depicts an example quorum of computing nodes according to example embodiments of the present disclosure.

Generally, the present disclosure is directed to computing systems in which respective quorums of computing nodes securely manage respective secrets associated with cryptographic ledgers according to threshold secret sharing schemes. In particular, membership in the quorums can be changed dynamically and unpredictability to improve security of the quorums against adversarial attacks in which adversaries attempt to compromise or gain control of the computing nodes. More specifically, by changing membership in the quorum dynamically and unpredictability, the ability of the adversary to control at any given time a threshold number of the current members of the quorum and gain access to the secret is dramatically reduced.

As such, one aspect of the present disclosure is directed to a Byzantine fault tolerant network of computing nodes working together to maintain many parallel append-only cryptographic ledgers. Each computing node may include a secure cryptographic processor which can be referred to as a trusted hardware modules (THM) or a trusted platform module (TPM). In particular, to achieve enterprise-level scale, aspects of the present disclosure can break up the global set of nodes into many parallel quorums, each maintaining their own ledger. In some implementations, the network is expected to include hundreds of thousands of computing nodes or more while small subsets of nodes cooperate to perform transactions on a specific blockchain. Each of the subsets of nodes can be referred to as a quorum.

The members of a quorum can collectively share a secret associated with the corresponding cryptographic ledger according to a threshold sharing scheme, in which each quorum member stores only a respective share of the secret and a threshold number of the quorum members are required to participate/collaborate to computationally produce the secret. One example secret sharing scheme that can be used is Shamir secret sharing. The secret can be any secret such as, for example, a private key used to control additions to the cryptographic ledger and/or decrypt encrypted data contained in the ledger. For example, the quorum can use the private key to encrypt data to a public key associated with the quorum.

More particularly, a quorum can use the secret to approve transactions that are written to an append-only cryptographic ledger. In some implementations, certain threshold sharing schemes are used such that, if there are n nodes in a quorum, attackers must disrupt floor((n+2)/3) nodes to disrupt actions taken by the quorum. Similarly, the attackers must compromise ceiling((2*n+1)/3) nodes to extract the quorum secret and decrypt data protected by the quorum.

This scheme can enable a user's most sensitive data to be locked in a vault (e.g., encrypted on the ledger using the secret) such that even individual members of the quorum cannot crack the vault. Rather, consensus is required among a threshold number of members of the quorum (which ideally are controlled by different hosts/entities) to access the encrypted information and/or perform operations on the cryptographic ledger. For example, in some implementations, ElGamal threshold encryption can be used to perform cryptographic operations with the quorum secret as specified by a smart contract. The operations can lie anywhere along the homomorphic spectrum, including partially homomorphic operations in which operations such as addition, subtraction, and multiplication are performed directly on the encrypted data (e.g., without needing to decrypt the data). As examples, the quorum can perform operations such as verify and re-encrypt; encrypt; decrypt; and sign. Thus, the quorum can decrypt data that is encrypted on the cryptographic ledger and give it in decrypted form to the owner of the ledger. In some implementations, the quorum can be configured to perform only operations which do not require any individual member of the quorum to see or have access to portions of the quorum secret other than their respective share.

To provide an example, a relatively small quorum might have as few as 7 nodes and, in such case, an attacker would need to disrupt 3 nodes to stop the quorum from functioning and compromise 5 nodes to gain access to the secret. Thus, for a 7-member quorum, a determined attacker might attempt to visit 5 different locations to extract secrets from 5 different computing nodes and succeed in deriving the quorum secret, which would enable the attacker to decrypt all data protected by the quorum.

To combat such an example attack, the example systems described herein leverage the principle that security improves with scale (e.g., number of computing nodes included in the quorum). That is, the more computing nodes added to the quorum, the harder it is for attackers to steal secrets because a larger number of machines will need to be compromised in order to meet the threshold number (which increases alongside size of the quorum). Thus, the present disclosure proposes systems and methods that improve network security with scale: the more computing nodes (e.g., THMs) that exist globally to participate in various blockchains, the more secure all the blockchains become. Alternatively, this principle can be viewed as the security of the network being proportional to the investment in hardware (e.g., in terms of number of nodes and/or security characteristics of the nodes).

Security also improves with diversity of nodes participating in the network, including, for example, diversity in terms of hardware design, geographic location, legal jurisdiction, and/or the identity of the host of the computing node. As one example, the presence of diversity in hardware design means that a bug or backdoor present in a single hardware type will not enable an adversary to gain control of a substantial number of the nodes of the quorum, as only a limited portion of the nodes of the single hardware type will be vulnerable to attack. In addition, in some implementations, a secret share stored by a computing node (e.g., in the THM) is stored only in volatile memory such as SRAM so that power loss erases them.

As another example, as regards geographic location, having the nodes in a quorum geographically dispersed means that adversaries seeking to gain physical control of the nodes would need to simultaneously attack the nodes at multiple different geographic locations, which represents a more challenging attack to execute. As yet another example, diversity in identity of the host of the computing node ensures that a single entity does not have access to the secrets. That is, should an adversary seek to compel the host of the computing nodes to divulge the secret, so long as the host does not control the threshold number of computing nodes, the host will be cryptographically unable to access the secret.

Furthermore, the longer a computing node possesses a quorum secret share, the more likely it is that an attacker has managed to compromise the computing node. Thus, the security of secrets protected by a quorum decreases with the age of the quorum. In view of this challenge and to further defend against adversarial attacks, the membership of a quorum can be changed dynamically. As one example, one or more new members can be elected for inclusion in the quorum with some frequency (e.g., periodically). In some implementations, the new members of a particular quorum can be selected by the existing members of such quorum (e.g., according to a voting scheme). In another example which will be discussed in further detail elsewhere herein, the membership of each quorum can be controlled by a master quorum of computing nodes that oversees membership in and the operations of many subordinate quorums.

In one particular example of dynamic membership changes, once per some time period (e.g., one hour or randomly), some or all of the members of a quorum can be replaced with new member(s). For example, to increase unpredictability, the new member(s) can be selected from the network at random (e.g., selected at random from a set of candidates that satisfy one or more selection constraints). Membership selection can be unpredictable so that an attacker cannot predict with substantial certainty which computing nodes will host the quorum secrets in the next iteration of the quorum.

Whenever one or more members are replaced, the secret shares can be re-keyed, meaning any shares attackers already know become useless. The re-keying can be performed by the existing members of the quorum or can be performed by the master quorum. Thus, in an example, if five colluding attackers attempt to attack a specific quorum, there is little chance that all five will be able to successfully gain access to the node before the membership of the quorum changes. Another potential attack might seek to compromise a significant fraction of all nodes globally and wait for a random selection of quorum members to contain floor((n+2)/3) compromised nodes. However, for networks that include a pool of hundreds of thousands of candidate nodes, the attack will very likely be discovered before it succeeds.

According to another aspect of the present disclosure, in some implementations, the membership of each quorum can be controlled by a master quorum of computing nodes that oversees the operations of the many subordinate quorums associated with the different cryptographic ledgers. For example, each subordinate quorum can periodically (e.g., once per hour and/or when a quorum rekeys) send a quorum-signed proof of liveness to the master quorum. In response, the master quorum can provide a signed certificate of operation that validates the subordinate quorum operations for an additional amount of time (e.g., two hours). Any subordinate quorum member that does not see a new certificate of operation within the specified time period (e.g., the two hours) can erase its quorum secret share and leave the quorum. Likewise, if the master quorum fails to see proof of liveness for a certain time period (e.g., three hours), the master quorum can cancel the current iteration of the subordinate quorum and automatically resurrect a new iteration of the subordinate quorum.

In addition, in some implementations, the master and subordinate quorums can use quorum departure certificates to ensure that two subsequent iterations of a subordinate quorum do not perform multiple conflicting operations. For example, this process may assist in preventing roll-back attacks in which an attacker performs transactions with the subordinate quorum, kills the subordinate quorum (e.g., by remotely turning off power to the machines hosting the corresponding computing nodes), and then waits for the master quorum to restart the subordinate quorum. Attacks of this nature can result, for example, in double-spending of cryptographic currencies or other undesirable events. As such, in some implementations of the present disclosure, each member of a subordinate quorum can be configured or required to record a "quorum departure certificate" in persistent storage before dropping out of a subordinate quorum. The master quorum can then require some number (e.g., greater than one-third) of quorum member's departure certificates prior to re-starting the subordinate quorum. This can ensure that no further transactions were approved by previous iteration of the subordinate quorum prior to instantiation of the subsequent iteration of the subordinate quorum. In particular, in some implementations, the quorum departure certificate with the highest verifiable transaction number can prove exactly when the quorum stopped functioning.

Thus, a cryptographic network can be built in two or more layers (e.g., a master quorum layer and one or more subordinate quorum layers) that provide different tradeoffs between security and transaction efficiency. For example, a subordinate quorum with a relatively smaller number of members may have a limited ability to be reliable and relatively lower security controls but very high efficiency/transaction processing speed. On the other hand, the master quorum, which may have a significantly larger number of members, may be able to always retain data and have much higher security controls but may have relatively lower efficiency/transaction processing speed. In such multi-tiered scheme, different operations can be allocated to and performed at the tier that provides the optimal tradeoff between security and efficiency for that operation. In addition, in some implementations, the shares of the master secret stored by nodes in the master quorum can be stored in a non-volatile memory (e.g., disk) while nodes in a subordinate quorum can store their shares of a secret in volatile memory (e.g., SRAM).

One example use of the master and subordinate quorum system described herein is to perform key escrow in which the master quorum stores the respective private key for each separate subordinate quorum. For example, the respective private key for every subordinate quorum can be stored on the cryptographic ledger of the master quorum and encrypted using master quorum secret. The master quorum does not need to actually see the keys to supply them to iterations of the subordinate quorums. Thus, the subordinate quorums can be viewed as escrowing their secrets with the master quorum. However, unlike traditional key escrow, the quorum secret does not ever need to be revealed, and the terms of the original smart contract are never violated.

In some implementations, each quorum can implement or otherwise operate in accordance with a smart contract. For example, the smart contract can correspond to or encode a customer-specific blockchain application. The quorum smart contract can be visible to the entire network of computing nodes and can be included on the corresponding cryptographic ledger. The smart contract can include rules that control quorum operations such as, for example, restricting what the quorum can do with the encrypted data and/or specifying certain conditions under which encrypted information can be revealed.

According to an aspect of the present disclosure, rules can be drafted into the smart contract which enable a desired balance to be struck between security, compliance, and transparency. As one example, a smart contract can include at least one rule that enables control of the corresponding quorum via a backdoor under the condition that each instance of control of the quorum undertaken under the at least one rule is irreversibly acknowledged on the cryptographic ledger. Thus, such a rule would permit the use of backdoor control in cases of emergency but would make the use the backdoor transparent and documented. As such, if a quorum is required to have a particular behavior, such as the ability to decrypt a user's data under certain conditions, then that behavior can be written into the smart contract for the whole network to see, thereby allowing compliance with the behavior in a transparent and non-secretive fashion.

In another example, a rule of the smart contract can enforce a privacy guarantee including, for example, only permitting processing of encrypted data using code that is publicly available. For example, any set of private data can have a contract or policy attached to it. The smart contract can ensure that the data is provided only to entities that can prove that they abide by the contract/policy.

While the systems and methods proposed herein can naturally support transactions involving currencies such as cryptocurrencies, there is not required to be an inherent cryptocurrency associated with the ledgers, like is required for Ethereum and Bitcoin. Instead, entities can simply contract for cloud providers to run their blockchain applications on cloud computing nodes supported by the cloud providers. Alternatively or additionally, entities can provide their own computing nodes for participation in the network. This scheme can enable efficient and fast nano-transactions at scale, unlike blockchain technologies which record all transactions on a common blockchain.

With reference now to the Figures, example embodiments of the present disclosure will be discussed in further detail.

Example Devices and Systems

FIG. 1 depicts an example quorum 100 of computing nodes according to example embodiments of the present disclosure. In particular, the quorum 100 includes n computing nodes with nodes 104, 106, and 108 being shown as representatives. The quorum 100 can collectively operate to access data from and/or append data to a cryptographic ledger 102. In some implementations, the nodes 104-108 included in the quorum 100 can be a subset of a larger (e.g., significantly larger) number of computing nodes included in a cryptographic network of nodes.

Each computing node 104-108 can be a computing device of some kind, including, as examples, smartphones, laptop computers, personal computers, server computing devices, embedded computing devices, and/or various other kinds of computing devices. In some implementations, the nodes can be virtual machines that are run on a computing device. Two nodes can be implemented by different computing devices or can be implemented as virtual machines on the same computing device.

Each computing node can include one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can include volatile memory (e.g., DRAM, SRAM) and non-volatile memory (e.g., disk storage). The memory can store data and instructions which are executed by the processor to cause the computing node to perform operations.

In some implementations, some or all of the computing nodes may include or be a secure cryptographic processor which can be referred to as a trusted hardware modules (THM) or a trusted platform module (TPM). The cryptographic processor can be a dedicated computer on a chip or microprocessor for carrying out cryptographic operations, embedded in a packaging with multiple physical security measures, which give it a degree of tamper resistance.

The members of a quorum 100 can collectively share a secret s associated with the corresponding cryptographic ledger 102. The secret s can be shared according to a threshold sharing scheme, in which each quorum member stores only a respective share of the secret and a threshold number of the quorum members are required to participate/collaborate to computationally produce the secret. For example, computing node 104 stores a first share 114 of s, computing node 106 stores a second share 116 of s, and computing node 108 stores an nth share of s. One example secret sharing scheme that can be used is Shamir secret sharing. The secret can be any secret such as, for example, a private key used to control additions to the cryptographic ledger and/or decrypt encrypted data contained in the ledger.

The quorum 100 can use the secret s to approve transactions that are written to the cryptographic ledger 102. In some implementations, certain threshold sharing schemes are used such that, if there are n nodes in the quorum 100, attackers must disrupt floor($(n+2)/3$) nodes to disrupt actions taken by the quorum 100. Similarly, the attackers must compromise ceiling ((2*n+1)/3) nodes to extract the quorum secret s and decrypt data protected by the quorum 100 (e.g., encrypted data stored on the cryptographic ledger 102).

A respective copy of the cryptographic ledger 102 can be stored on some or all of the computing nodes 104-118. Alternatively or additionally, a copy of the cryptographic ledger 102 can be stored at another location (e.g., a server-based address) which is accessible by the computing nodes 104-118. As examples, the quorum 100 can perform operations such as verify and re-encrypt; encrypt; decrypt; and sign. Thus, the quorum 100 can decrypt data that is encrypted on the cryptographic ledger 102 and give it in decrypted form to the owner of the ledger 102.

In some implementations, the quorum 100 can include two or more different types of nodes. For example, the quorum 100 can include storage nodes and compute nodes. Each of the storage nodes can have a full copy of the cryptographic ledger 102 and can run a Byzantine fault tolerant consensus protocol with respect to the ledger 102. For example, the storage nodes may have only a limited number of tasks such as collectively agreeing upon the order of entries upon the ledger 102 and proving it to the computing nodes. In some implementations, the storage nodes do not have a cryptographic processor (e.g., THM/TPM) and do not store any shares of the corresponding secret. However, storage nodes may be provided by multiple different vendors and provide some level of robustness to the ledger 102. By contrast, in some implementations, compute nodes do include cryptographic processors (e.g., THMs/TPMs), store shares of the secret, and/or perform secret processing.

In some implementations, communication among the nodes in the quorum 100 and other nodes included in the network can occur using peer-to-peer protocols and/or can occur over a communications network. The communications network can be any type of communications network, such as a local area network (e.g., intranet), wide area network (e.g., Internet), or some combination thereof and can include any number of wired or wireless links. In general, communication over the communications network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

According to an aspect of the present disclosure, the membership of the quorum 100 can be changed dynamically. As one example, one or more new members can be elected for inclusion in the quorum with some frequency (e.g., periodically). As an example, FIG. 1 illustrates a replacement computing node 150 that has been selected to replace computing node 104 in the quorum 100. Although a single replacement node is shown, in some implementations, all of the nodes in the quorum (e.g., all of nodes 104-108) can be simultaneously replaced. In some implementations, the number n of nodes in the quorum 100 can change over time (e.g., according to various inputs and/or constraints) or, in other implementations, the number n of nodes in the quorum 100 can remain fixed. Thus, in some implementations, a new member can be added to the quorum 100 without removal of an existing member and/or vice versa.

In some implementations, the new members of the quorum 100 can be selected by the existing members of such quorum (e.g., by nodes 104-108). In another example which will be discussed with reference to FIG. 2, the membership of the quorum 100 can be controlled by a master quorum of computing nodes that oversees membership in and the operations of the quorum 100. Example methods that can be performed to select nodes for inclusion in the quorum 100 will be discussed elsewhere herein with reference to FIG. 3.

In one particular example of dynamic membership changes, once per some time period (e.g., one hour), some or all of the members of a quorum can be replaced with new member(s). For example, to increase unpredictability, the new member(s) can be selected from the network at random (e.g., selected at random from a set of candidates that satisfy one or more selection constraints). Membership selection can be unpredictable so that an attacker cannot predict with substantial certainty which computing nodes will host the quorum secrets in the next iteration of the quorum.

Whenever one or more members are replaced, the secret shares can be re-keyed, meaning any shares attackers already know become useless. The re-keying can be performed by the existing members of the quorum or can be performed by the master quorum. Thus, in an example, if five colluding attackers fly to five different countries at the same time to attack a specific quorum, there is little chance that all five will be in the right country when they land. Another potential attack might seek to compromise a significant fraction of all nodes globally and wait for a random selection of quorum members to contain floor ((n+2)/3) compromised nodes. However, for networks that include a pool of hundreds of thousands of candidate nodes from which to select new members, the attack will very likely be discovered before it succeeds.

Figure 2:
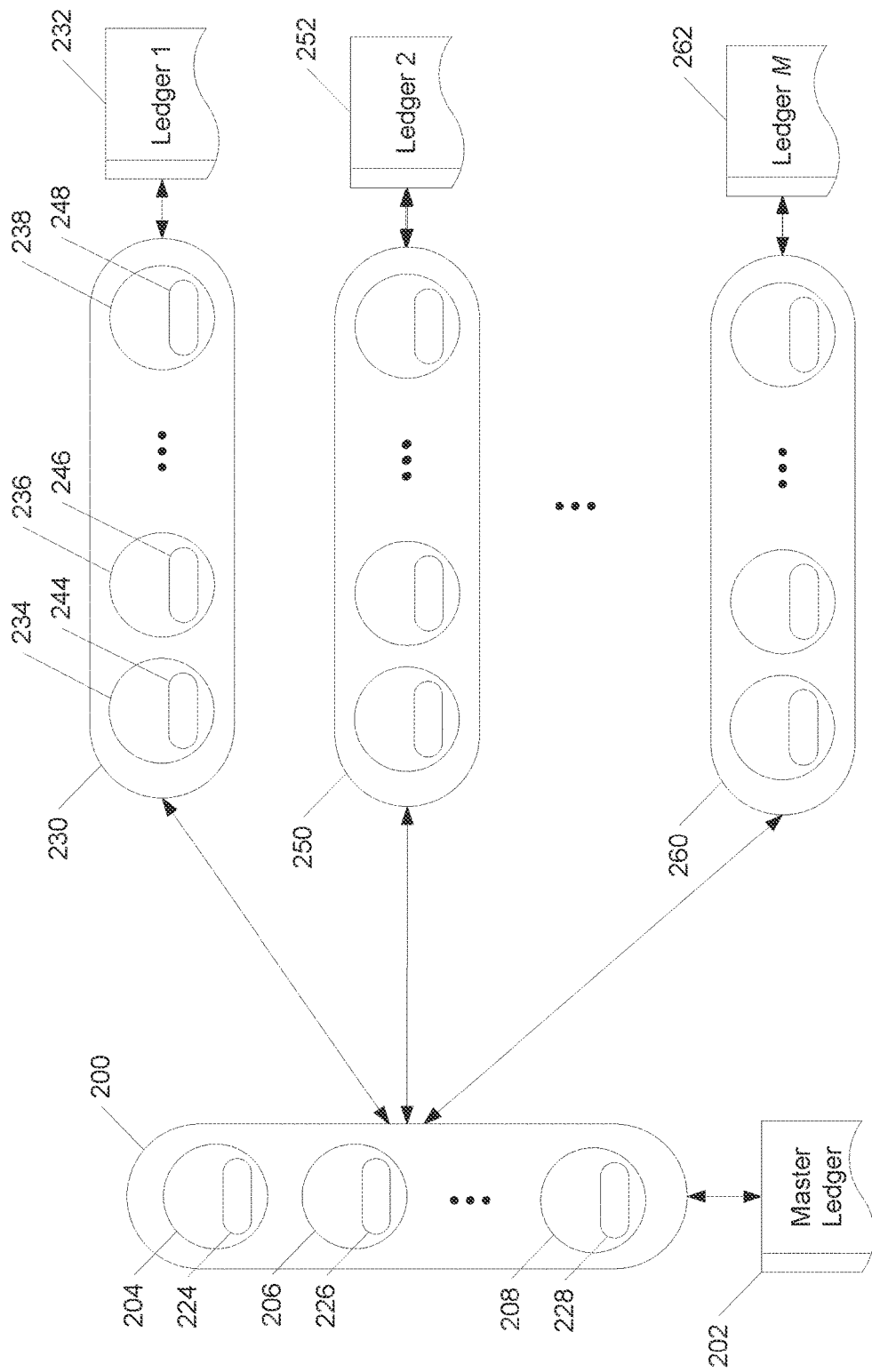
FIG. 2 depicts an example master quorum and a plurality of subordinate quorums according to example embodiments of the present disclosure.

FIG. 2 depicts an example master quorum 200 and a plurality of subordinate quorums 230, 250, and 260 according to example embodiments of the present disclosure. In particular, according to another aspect of the present disclosure, in some implementations, a large number of different and independent cryptographic ledgers can be established. For example, FIG. 2 illustrates M cryptographic ledgers, with ledgers 232, 252, and 262 being shown as representatives. The number M can be any number (e.g., in the hundreds of thousands) and can scale to match demand.

Each cryptographic ledger (e.g., 232, 252, and 262) can be associated with a particular entity. For example, entities can include specific individual users, groups of one or more users, an account (e.g., an individual account or an account shared by one or more users such as a corporate account), an organization (e.g., corporation or division of corporation), or any other entity with which a specific set of data is associated and desired to be placed on an individual cryptographic ledger. Thus, as examples, each cryptographic ledger 232, 252, 262 can correspond to one or more financial accounts, supply chains, insurance policies, goods shipments, legal rights (e.g., copyright rights), certificates of authentication, databases for different applications, etc.

Similar to the description provided with reference to FIG. 1, a respective subordinate quorum can be established to control access to data encrypted on the respective ledger and/or the ability to write transactions to the respective ledger. For example, a subordinate quorum 230 that includes nodes 234, 236, and 238 (as representatives) has been established to control activity relative to the ledger 232 (e.g., using respective secret shares 244, 246, and 248). Similarly, subordinate quorum 250 has been established to control activity relative to ledger 252 and subordinate quorum 260 has been established to control activity relative to ledger 262.

The number of nodes in each subordinate quorum (e.g., 230, 250, 260) can be the same or can be different. The number of nodes in each subordinate quorum (e.g., 230, 250, 260) can be fixed or can change over time. The number of nodes in each subordinate quorum (e.g., 230, 250, 260) can be adaptive to various variables such as, for example, the location, identity, and/or security properties of the nodes currently included in the quorum. The number of nodes in each subordinate quorum (e.g., 230, 250, 260) can be controlled by a user-defined variable which may be defined by the entity associated with the corresponding cryptographic ledger. The number of nodes in the subordinate quorum associated with a cryptographic ledger may be controlled by a smart contract associated with the ledger.

Similar to the description provided with reference to FIG. 1, the nodes included in each subordinate quorum can share a respective secret associated with its respective cryptographic ledger using a threshold secret sharing scheme. For example, nodes 234, 236, and 238 can each store a respective share of a respective secret associated with ledger 323. Likewise, the nodes of quorum 250 can share a respective secret associated with ledger 252, which will differ from the secret associated with ledger 232 and managed by quorum 230.

According to an aspect of the present disclosure, the membership of each subordinate quorum 230, 250, and 260 can be controlled by the master quorum of computing nodes 200. As has been described, the master quorum 200 can include any number of computing nodes, with nodes 204, 206, and 208 being illustrated as representatives. Generally, however, it is envisioned that the number of nodes included the master quorum 200 will be significantly larger (e.g., orders of magnitude larger) than the number of nodes included in any one of the subordinate quorums 230, 250, 260. As one illustrative example, a given subordinate quorum may include tens of nodes while the master quorum 200 may include hundreds of thousands of nodes. In some implementations, every node on the network can be included in the master quorum 200. In some implementations, members of master quorum 200 know the identity of all the other members of the master quorum 200.

The nodes of the master quorum 200 (e.g., nodes 204, 206, 208) can store respective shares of a master secret associated with a master ledger 202 (e.g., according to a threshold secret sharing scheme). For example, nodes 204, 206, and 208 are illustrated as storing shares 224, 226, and 228, respectively. In some implementations, membership of the master quorum does not ever change. In other implementations, membership of the master quorum can dynamically change but at a lower frequency relative to changes in membership of subordinate quorums.

The master quorum 200 can store the respective secret associated with each of the subordinate quorums/cryptographic ledgers by encrypting the subordinate secrets onto the master ledger 202 (e.g., encrypting the subordinate secrets onto the master ledger 202 using the master secret). In particular, in some implementations, the master quorum 200 can initialize (birth) and/or re-initialize each of the subordinate quorums (e.g., 230, 250, 260). For example, all nodes in the master quorum 200 can vote to start or re-start a subordinate quorum. In some implementations in which the master quorum 200 controls membership of each subordinate quorum, the members of a previous iteration of a subordinate quorum do not need to communicate with members of a subsequent iteration of the subordinate quorum. Instead, the master quorum 200 can simply select the members of the new iteration and supply them with their secret shares. For example, the master quorum 200 can retrieve the corresponding subordinate secret from the master ledger 202 and supplying new shares of the retrieved secret to the members of the new iteration of the subordinate quorum. The master quorum 200 can replace individual members of a subordinate quorum or can replace all members wholesale. The master quorum 200 can re-randomize the shares held by subordinate quorum members at each instance in which one or more new members are added to the subordinate quorum.

Thus, one example use of the master and subordinate quorum system illustrated in FIG. 2 is to perform key escrow in which the master quorum 200 stores the respective private key for each separate subordinate quorum (e.g., 230, 250, 260). For example, the respective private key for every subordinate quorum can be stored on the master cryptographic ledger 202 of the master quorum 200 and encrypted using master quorum secret. The master quorum 200 does not need to actually see the keys to supply them to iterations of the subordinate quorums. Thus, the subordinate quorums 230, 250, 260 can be viewed as escrowing their secrets with the master quorum 200. However, unlike traditional key escrow, the quorum secret does not ever need to be revealed, and the terms of the original smart contract are never violated.

In some implementations, a particular computing node can participate in multiple quorums at the same time. For example, computing node 204 of the master quorum 200 could also simultaneously serve as computing node 234 of subordinate quorum 230 and/or as a member of subordinate quorum 250. In particular, in one example, the master quorum 200 includes all of the computing nodes on the network as a whole such that the nodes of the master quorum 200 are not a separate set of hardware devices from the subordinate quorum nodes, but instead simply operate as logically separate nodes.

In some implementations, each subordinate quorum 230, 250, 260 can periodically (e.g., once per hour and/or when the quorum rekeys) send a quorum-signed proof of liveness to the master quorum 200. In response, the master quorum 200 can provide a signed certificate of operation that validates the subordinate quorum operations for an additional amount of time (e.g., two hours). Any subordinate quorum member (e.g., node 234) that does not see a new certificate of operation within the specified time period (e.g., the two hours) can erase its quorum secret share (e.g., share 244) and leave the quorum. Likewise, if the master quorum 200 fails to see proof of liveness for a certain time period (e.g., three hours), the master quorum 200 can cancel the current iteration of the subordinate quorum and automatically resurrect a new iteration of the subordinate quorum.

As described above, in some implementations, membership of the master quorum 200 does not ever change. However, in other implementations, membership of the master quorum 200 can dynamically change. As one example, while new nodes may not join the master quorum 200, nodes may "die off" or otherwise leave the master quorum 200. In another example, new computing nodes may join the master quorum 200 (e.g., subject to some restrictions).

In some implementations, the membership of the master quorum 200 can be designed/controlled to defend against a Sibyl attack in which an adversary attempts to add sufficient numbers of adversary-controlled computing nodes to the master quorum 200 to influence the actions of the master quorum 200. For example, the adversary-controlled computing nodes can be cheap emulations of THMs, rather than real hardware.

To combat against such attacks, in some implementations, new nodes cannot join or be added to a master quorum 200 (e.g., although nodes can depart or "die off"). In other implementations, the size of the master quorum 200 may have a limited growth rate (e.g., 1% per day). By prohibiting or limiting growth of the master quorum 200 in this fashion, Sibyl attacks can be thwarted as an adversary is unable to add enough new members to gain control of the master quorum 200.

However, limiting the growth of the master quorum 200 can be problematic if the network needs to scale and the master quorum 200 cannot similarly scale to meet the demand. Thus, in some implementations, multiple generations of the master quorum 200 can be established. The next generation of the master quorum 200 can include some or all of the nodes of the previous generation of the master quorum 200 and can also additionally include any number of new computing nodes. The creation of a new generation of the master quorum 200 can occur periodically (e.g., once per fiscal quarter), upon the detection of a flaw or other operational issue in the current generation of the master quorum 200, or in response to other demands (e.g., the demand for generation of a significant number of new subordinate quorums). Multiple generations of the master quorum 200 can exist at the same time. Thus, the master-subordinate network scheme can be replicated in a controlled fashion to allow for scaling and growth in the network while also providing protections against Sibyl attacks where an adversary may attempt to quickly add large numbers of computing nodes and maliciously control operations prior to being detected. Computing nodes can be vetted and approved prior to and during participation in a new generation of the master quorum 200. For example, a node manufacturer can provide attestation controls to constantly check the security status of nodes.

However, typically a subordinate quorum will only trust the particular generation of the master quorum that birthed the subordinate quorum. As such, subordinate quorums can be provided with a way (e.g., written into the corresponding smart contract) to transfer their data from a previous generation of the master quorum 200 to a subsequent one. Thus, while an existing subordinate quorum may not trust an expanded master quorum, if the controlling entity believes that the network is sufficiently honest on the whole, the controlling entity can invoke (e.g., using their signing key) the transfer mechanism (e.g., as provided in the smart contract) to transfer their data to a subordinate quorum operating under the newly expanded master quorum generation. Thus, if the subordinate quorum is protecting an entity's crypto-currency, the entity should have a way to forward those assets to a new subordinate quorum running under a new generation of the master quorum 200 when the entity authorizes the move.

Thus, a cryptographic network can be built in two or more layers (e.g., a master quorum layer and one or more subordinate quorum layers) that provide different tradeoffs between security and transaction efficiency. For example, a subordinate quorum (e.g., 230) with a relatively smaller number of members may have a limited ability to be reliable and relatively lower security controls but very high efficiency/transaction processing speed. On the other hand, the master quorum 200, which may have a significantly larger number of members, may be able to always retain data and have much higher security controls but may have relatively lower efficiency/transaction processing speed. In such multi-tiered scheme, different operations can be allocated to and performed at the tier that provides the optimal tradeoff between security and efficiency for that operation.

Furthermore, although FIG. 2 illustrates a network that includes two tiers, the systems and methods of the present disclosure can include networks partitioned into any number of different tiers. As an example, quorum 230 could serve as a master quorum for another, more subordinate tier of quorums/ledgers. For example, quorum 230 could store the secrets for such further subordinate quorums on the ledger 232 and control membership in such further subordinate quorums, and so on. Thus, an entity may be able to design and/or control a multi-tiered quorum/ledger structure that satisfies their individual enterprise-level needs/use case.

Example Methods

Figure 3:
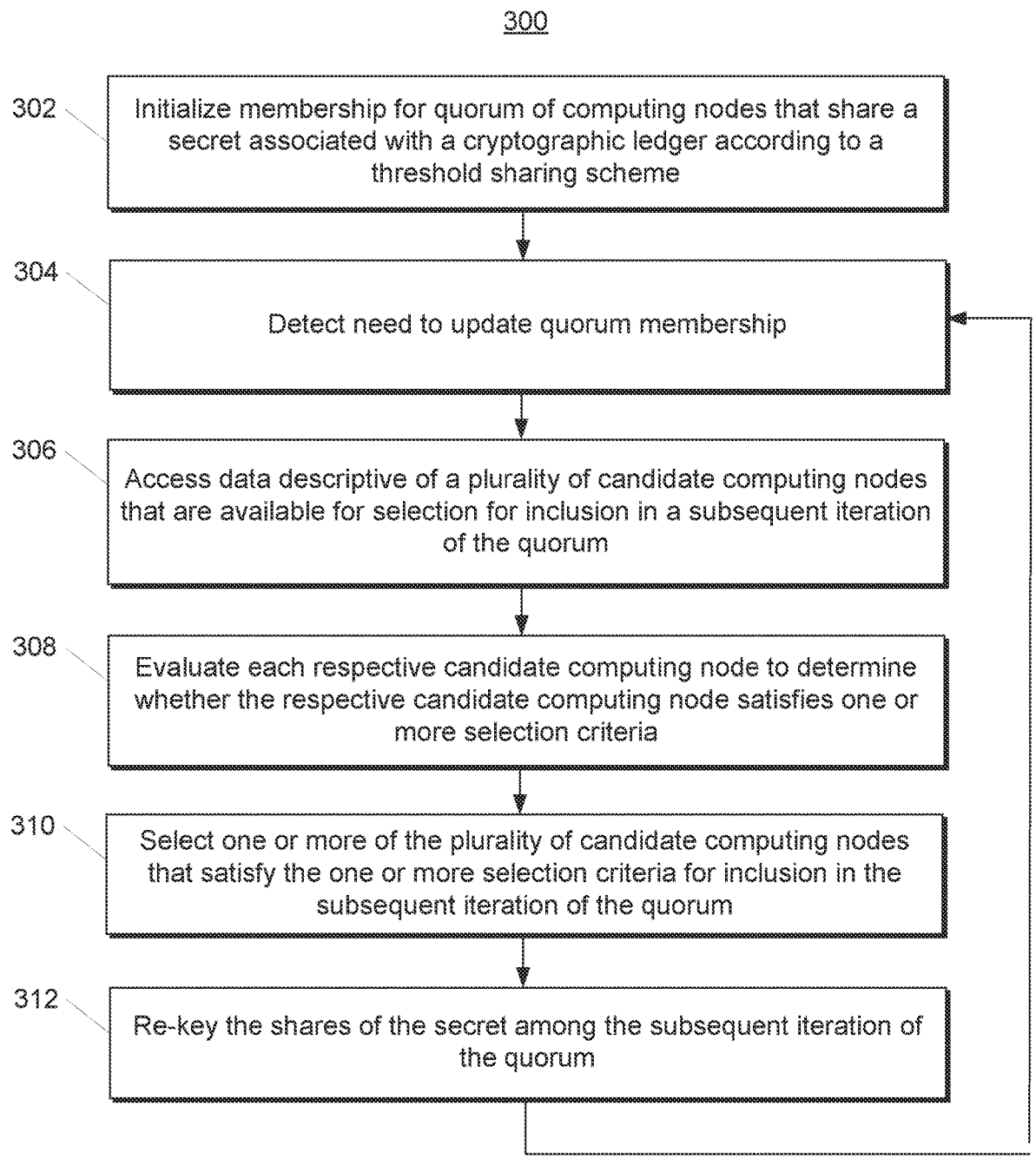
FIG. 3 depicts a flow chart diagram of an example method for dynamically updating quorum membership according to example embodiments of the present disclosure.

FIG. 3 depicts a flow chart diagram of an example method 300 for dynamically updating quorum membership according to example embodiments of the present disclosure. In some implementations, method 300 can be performed by the members of the quorum for which membership is being changed. In other implementations, method 300 can be performed by a master quorum that is controlling membership of a subordinate quorum for which membership is being changed.

At 302, a computing system can initialize membership for a quorum of computing nodes for a cryptographic ledger. The current iteration of the quorum can include a first set of computing nodes that respectively store respective shares of a secret associated with the cryptographic ledger according to a threshold secret sharing scheme. For example, the secret can be a private key. In some implementations, the cryptographic ledger can contain encrypted information and the quorum can be configured to use the secret to decrypt the encrypted information and/or write transactions to the ledger.

At 304, the computing system can detect a need to update the quorum membership. For example, the quorum membership can be updated periodically (e.g., once per hour). In another example, the quorum membership can be updated when certain events occur such as a certain number of computing nodes included in the current iteration of the quorum failing to respond or provide a proof-of-life signal or being assessed as being corrupted, offline, or otherwise out of operation. Thus, nodes that lose power or break can be replaced quickly. As another example, quorum membership can be updated at random intervals. As another example, quorum membership can be updated upon a request by the owner of the cryptographic ledger.

At 306, the computing system can access data descriptive of a plurality of candidate computing nodes that are available for selection for inclusion in a subsequent iteration of the quorum for the cryptographic ledger. The subsequent iteration of the quorum can include a second set of computing nodes.

At 308, the computing system can evaluate each respective candidate computing node of the plurality of candidate computing nodes to determine whether the respective candidate computing node satisfies one or more selection constraints.

As one example, the one or more selection constraints can include a geographic location constraint that requires diversity among respective geographic locations associated with the second set of computing nodes. As another example, the one or more selection constraints can include a legal jurisdiction constraint that requires diversity among respective legal jurisdictions in which the second set of computing nodes are located. As yet another example, the one or more selection constraints can include a hardware constraint that requires diversity among respective hardware devices associated with the second set of computing nodes. As another example, the one or more selection constraints can include a host identity constraint that requires diversity among respective host identities associated with the second set of computing nodes. As yet another example, the one or more section constraints can include user-defined constraints that require the computing nodes to satisfy one or more arbitrary user-defined criteria. The selection criteria can change over time or can be fixed. The selection criteria can be specific to the particular quorum at hand and can be different for different quorums.

At 310, the computing system can select one or more of the plurality of candidate computing nodes that satisfy the one or more selection constraints for inclusion in the second set of computing nodes that form the subsequent iteration of the quorum for the cryptographic ledger. In some implementations, the second set of computing nodes overlap at least in part with the first set of computing nodes. In other implementations, the second set of computing nodes do not overlap with the first set of computing nodes.

As one example, in some implementations, selecting the one or more candidate computing nodes at 310 can include identifying a plurality of satisfactory candidate computing nodes that satisfy the one or more selection constraints and randomly selecting, for inclusion in the second set of computing nodes, the one or more candidate nodes from the plurality of satisfactory candidate computing nodes.

In some implementations, evaluating each respective candidate computing node of the plurality of candidate computing nodes to determine whether the respective candidate computing node satisfies the one or more selection constraints at 308 can include generating a respective score for each respective candidate computing node that describes a degree to which the respective candidate computing node satisfies the one or more selection constraints. In some implementations, the score can be calculated using user-defined weightings that provide relative weights of importance to different selection criteria. In some of such implementations, selecting the one or more candidate computing nodes at 310 can include selecting the one or more of the plurality of candidate computing nodes based at least in part on the respective scores determined for the candidate computing nodes.

In some implementations, selecting the one or more candidate computing nodes for inclusion in the second set of computing nodes can include identifying a number of satisfactory candidate computing nodes that satisfy the one or more selection constraints and determining whether the number of satisfactory candidate computing nodes is less than a threshold number. When the number of satisfactory candidate computing nodes is less than the threshold number, the method 300 can include waiting until the number of satisfactory candidate computing nodes is not less than the threshold number to select the one or more candidate nodes for inclusion in the second set of computing nodes.

At 312, the computing system can re-key the shares of the secret among the subsequent iteration of the quorum. Thus, the computing system can cause handoff from the current iteration of the quorum to the subsequent iteration of the quorum, wherein the handoff comprises generation of new respective shares of the secret that are respectively stored by the second set of computing nodes.

After 312, method 300 can return to 304 and await the next detection of a need to update quorum membership. In such fashion, the membership of the quorum can be dynamically updated in an unpredictable fashion.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

What is claimed is:

1. A computing system comprising:
   one or more processors; and
   one or more non-transitory computer-readable media storing instructions that are executable to perform operations, the operations comprising:
   storing, by one or more master computing nodes of a master quorum, a master secret according to a threshold secret sharing scheme, wherein the master quorum is configured to use the master secret to control changes in a respective membership of each of a plurality of subordinate quorums that are respectively associated with a plurality of cryptographic ledgers, wherein the respective membership of each subordinate quorum comprises a dynamically changing plurality of subordinate computing nodes that respectively store respective shares of a respective subordinate secret associated with the respective cryptographic ledger according to the threshold secret sharing scheme;
   periodically receiving, by the master quorum, a quorum-signed proof of liveness from each subordinate quorum; and
   providing, by the master quorum, responsive to receipt of the quorum-signed proof of liveness from at least one subordinate quorum of the subordinate quorums, a certificate of operation to the at least one subordinate quorum, wherein the certificate of operation specifies a period of time for which the subordinate quorum is approved to operate, and wherein each subordinate computing node is configured to erase its respective share of the respective subordinate secret when its current certificate of operation expires and it has not received a new certificate of operation.

2. The computing system of claim 1, the operations comprising:

receiving, by the master quorum, information excluding the proof of liveness from the at least one subordinate quorum; and erasing, by the master quorum, responsive to receiving the information excluding the proof of liveness from the at least one subordinate quorum, the at least one subordinate quorum's respective share of the respective subordinate secret.

3. The computing system of claim 1, wherein the information excluding the proof of liveness from the at least one subordinate quorum comprises the at least one subordinate quorum's certificate of operation expiring and no new certificate of operation being received.

4. The computing system of claim 1, wherein each master computing node stores its respective share of the master secret in a non-temporary memory location that persists against node power failure.

5. The computing system of claim 1, wherein each subordinate computing node stores its respective share of the subordinate secret in a temporary memory location that does not persist against node power failure.

6. The computing system of any claim 1, wherein the master quorum is configured to vote to start or re-start a given subordinate quorum.

7. The computing system of claim 1, wherein the master quorum is configured to periodically receive a quorum-signed proof of liveness from each subordinate quorum.

8. The computing system of claim 5, wherein, in response to receipt of the quorum-signed proof of liveness from one of the subordinate quorums, the master quorum is configured to provide a certificate of operation to the subordinate quorum, wherein the certificate of operation specifies a period of time for which the subordinate quorum is approved to operate, and wherein each subordinate computing node is configured to erase its respective share of the respective subordinate secret when its current certificate of operation expires and it has not received a new certificate of operation.

9. The computing system of claim 5, wherein the master quorum is configured to:

detect when a proof of liveness has not been received from one of the subordinate quorums within a threshold period of time; and in response, re-initialize the subordinate quorum with the membership at least partially modified.

10. The computing system of claim 1, wherein at least one of the one or more cryptographic ledgers comprises a smart contract that controls operations of the respective subordinate quorum.

11. The computing system of claim 10, wherein the smart contract comprises at least one rule that enables control of the subordinate quorum via a backdoor under a condition that each instance of subordinate quorum control undertaken under the at least one rule is irreversibly acknowledged on the cryptographic ledger.

12. The computing system of claim 1, wherein:

a master cryptographic ledger is associated with the master quorum; and the master cryptographic ledger stores the respective subordinate secret associated with each cryptographic ledger.

13. A method to prevent a subordinate quorum from performing conflicting operations by:

obtaining, by a master quorum, from each subordinate member of the subordinate quorum before the subordinate member drops out of the subordinate quorum, a required quorum departure certificate;

requiring each subordinate member of the subordinate quorum to record a quorum departure certificate in persistent before dropping out of the subordinate quorum;

obtaining, by the master quorum, a request to re-start the subordinate quorum;

responsive to obtaining the request to re-start the subordinate quorum, obtaining the required quorum departure certificate from a plurality of subordinate members;

determining that a required number of subordinate members of the subordinate quorum have the required departure certificate; and restarting the subordinate quorum responsive determining that the required number of subordinate members of the subordinate quorum have the required departure certificate.

14. The method of claim 13, wherein the required number of subordinate members is a number greater than one third of the total number of subordinate members.

15. The method of claim 13, wherein the quorum departure certificate is associated with a verifiable transaction number.

16. The method of claim 13, wherein the quorum departure certificate with a highest verifiable transaction number comprises data indicative of the subordinate quorum stopping functioning.

17. One or more non-transitory computer-readable media storing instructions that are executable to cause one or more processors to perform operations, the operations comprising:

storing, by the one or more master computing nodes, a master secret according to a threshold secret sharing scheme, wherein the master quorum is configured to use the master secret to control changes in a respective membership of each of a plurality of subordinate quorums that are respectively associated with a plurality of cryptographic ledgers, wherein the respective membership of each subordinate quorum comprises a dynamically changing plurality of subordinate computing nodes that respectively store respective shares of a respective subordinate secret associated with the respective cryptographic ledger according to the threshold secret sharing scheme;

periodically receiving, by the master quorum, a quorum-signed proof of liveness from each subordinate quorum; and providing, by the master quorum, responsive to receipt of the quorum-signed proof of liveness from at least one subordinate quorum of the subordinate quorums, a certificate of operation to the at least one subordinate quorum, wherein the certificate of operation specifies a period of time for which the subordinate quorum is approved to operate, and wherein each subordinate computing node is configured to erase its respective share of the respective subordinate secret when its current certificate of operation expires and it has not received a new certificate of operation.

18. The one or more non-transitory computer-readable media of claim 17, wherein the required number of subordinate members is a number greater than one third of the total number of subordinate members.

19. The one or more non-transitory computer-readable media of claim 17, wherein the quorum departure certificate is associated with a verifiable transaction number.

20. The one or more non-transitory computer-readable media of claim 17, wherein the quorum departure certificate with a highest verifiable transaction number comprises data indicative of the subordinate quorum stopping functioning.

* * * * *